United States Patent
Rust

(10) Patent No.: US 12,281,587 B2
(45) Date of Patent: Apr. 22, 2025

(54) NACELLE INLET ASSEMBLY THAT PROMOTES LAMINAR FLOW

(71) Applicant: THE BOEING COMPANY, Arlington, VA (US)

(72) Inventor: Charles William Rust, Seattle, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/166,454

(22) Filed: Feb. 8, 2023

(65) Prior Publication Data

US 2024/0018881 A1  Jan. 18, 2024

Related U.S. Application Data

(60) Provisional application No. 63/368,565, filed on Jul. 15, 2022.

(51) Int. Cl.
| | | |
|---|---|---|
| *F01D 25/24* | (2006.01) |
| *B64D 15/06* | (2006.01) |
| *B64D 29/06* | (2006.01) |
| *B64F 5/10* | (2017.01) |

(52) U.S. Cl.
CPC ............. *F01D 25/24* (2013.01); *B64D 29/06* (2013.01); *B64F 5/10* (2017.01); *B64D 15/06* (2013.01)

(58) Field of Classification Search
CPC ........... F01D 25/24; B64F 5/10; B64D 29/06; B64D 15/06
See application file for complete search history.

(56) References Cited

U.S. PATENT DOCUMENTS

| | | | |
|---|---|---|---|
| 4,749,150 A | | 6/1988 | Rose et al. |
| 5,944,287 A | * | 8/1999 | Rodgers ............. F02C 7/047 |
| | | | 60/39.093 |
| 7,047,725 B2 | | 5/2006 | Moe et al. |
| 7,291,815 B2 | | 11/2007 | Hubert et al. |
| 7,588,212 B2 | | 9/2009 | Moe et al. |
| 7,923,668 B2 | | 4/2011 | Layland et al. |
| 8,919,494 B2 | | 12/2014 | Burkett et al. |
| 9,511,562 B2 | | 12/2016 | Kruckenberg et al. |
| 9,732,677 B1 | | 8/2017 | Chien et al. |
| 10,738,738 B2 | | 8/2020 | Lu et al. |
| 11,125,157 B2 | | 9/2021 | Thomas et al. |
| 11,174,815 B2 | | 11/2021 | Soria |

(Continued)

FOREIGN PATENT DOCUMENTS

| | | |
|---|---|---|
| EP | 2112353 B1 | 9/2011 |
| EP | 2219947 B1 | 2/2013 |
| FR | 2697495 A1 | 7/1995 |

*Primary Examiner* — Grant Moubry
*Assistant Examiner* — Ruben Picon-Feliciano
(74) *Attorney, Agent, or Firm* — Philip S. Hof; The Small Patent Law Group LLC

(57) ABSTRACT

An inlet assembly of a nacelle includes an inlet cowl that has a leading edge, an outer side that extends from the leading edge to an outer aft edge, and an inner side that extends from the leading edge to an inner aft edge. An exterior surface of the inlet cowl is seamless along an entire length of the outer side from the leading edge to the outer aft edge. The inlet cowl includes a lipskin that has a metallic coating. The metallic coating defines the exterior surface of the inlet cowl along the leading edge and the entire length of the outer side.

20 Claims, 9 Drawing Sheets

(56) References Cited

U.S. PATENT DOCUMENTS

| | | | |
|---|---|---|---|
| 11,261,786 B2 | 3/2022 | Pierick et al. | |
| 2013/0228653 A1* | 9/2013 | Breer | B64D 15/163 |
| | | | 244/134 D |
| 2016/0215700 A1 | 7/2016 | Yu et al. | |
| 2016/0305321 A1* | 10/2016 | Pujar | B64D 29/00 |
| 2016/0377090 A1* | 12/2016 | Brown | B64D 33/02 |
| | | | 415/9 |
| 2017/0008635 A1* | 1/2017 | Mackin | F02C 7/045 |
| 2019/0093557 A1* | 3/2019 | Thomas | B64D 33/02 |
| 2021/0033026 A1* | 2/2021 | Wijesinghe | B64D 33/02 |

\* cited by examiner

NACELLE INLET ASSEMBLY THAT PROMOTES LAMINAR FLOW

CROSS-REFERENCE TO RELATED APPLICATIONS

This application is a non-provisional conversion of, and claims priority to, U.S. Patent Application No. 63/368,565, filed Jul. 15, 2022, which is hereby incorporated by reference in its entirety.

FIELD OF THE DISCLOSURE

Embodiments of the present disclosure generally relate to the inlet section of a nacelle, such as an engine nacelle on an aircraft.

BACKGROUND

Some types of aircraft include engines attached to the wings, fuselage, or tail of the aircraft. The engines have nacelles which are outer casings for the engine components. A nacelle includes an inlet section at a leading or front end of the nacelle. The nacelle may also include a fan cowl, a thrust reverser section, and an aft fairing section located behind the inlet section along a longitudinal length of the nacelle. The inlet section has an inner barrel that defines an air inlet duct for directing air to the fan and downstream components of the engine. The inner barrel may have an acoustic panel to facilitate reducing noise created by the fan and a compressor of the engine.

Conventional engine inlets are challenged to provide natural laminar flow of air along the exterior surfaces of the inlets. Laminar flow is desirable for improving fuel efficiency, reducing drag, and/or the like. The exterior surfaces of known inlets have seams or joints between different sections of the inlet along the length of the inlet. For example, a metal or metal alloy lipskin may couple to a composite outer barrel panel at a joint. The seams and joints perturb the laminar air flow, such that laminar air flow is only achieved along the lipskin. Past the joint, the airflow along the composite outer barrel panel may be turbulent, which may reduce fuel efficiency. In addition to seams and joints, surface variability (e.g., roughness and unevenness) along the exterior surface of the inlet and limitations in metallic fabrication methods (e.g., depth of draw limitations) may also hinder laminar flow. As a result, known inlets are only able to achieve laminar flow along a relatively small length or area of the inlet.

Furthermore, there are several advantages associated with a compact nacelle. Shortening the nacelle along the longitudinal length may improve fuel burn and reduce drag, weight, and material costs. However, shortening the inlet undesirably further limits the natural laminar flow region along the exterior surface of the inlet. Shortening the inlet also limits the space available in which to integrate noise treatment and anti-ice systems. For example, there may be less space available within the inlet section for the acoustic panel.

SUMMARY OF THE DISCLOSURE

A need exists for a nacelle inlet assembly and method of assembly that enhances natural laminar flow along the exterior surface of the inlet cowl, enabling the aircraft to achieve greater fuel efficiency than if the airflow along the exterior surface of the inlet cowl is more turbulent. For example, the inlet assembly described herein may have a laminar flow region along the exterior surface that is longer than at least some conventional inlet designs. The laminar flow region along the outer side of the inlet cowl may extend beyond an aft edge of the inner side of the inlet cowl and/or beyond a fan cowl split line.

Certain embodiments of the present disclosure provide an inlet assembly of a nacelle. The inlet assembly includes an inlet cowl that has a leading edge, an outer side that extends from the leading edge to an outer aft edge, and an inner side that extends from the leading edge to an inner aft edge. An exterior surface of the inlet cowl is seamless along an entire length of the outer side from the leading edge to the outer aft edge. The inlet cowl includes a lipskin that has a metallic coating. The metallic coating defines the exterior surface of the inlet cowl along the leading edge and the entire length of the outer side.

Certain embodiments of the present disclosure provide a method (e.g., for forming a nacelle inlet assembly). The method includes forming an inlet cowl that includes a leading edge, an outer side that extends from the leading edge to an outer aft edge, and an inner side that extends from the leading edge to an inner aft edge. The inlet cowl is formed such that an exterior surface of the inlet cowl is seamless along an entire length of the outer side from the leading edge to the outer aft edge. The inlet cowl is formed by forming a lipskin that has a metallic coating. The metallic coating defines the exterior surface of the inlet cowl along the leading edge and the entire length of the outer side.

Certain embodiments of the present disclosure provide an inlet assembly of a nacelle. The inlet assembly includes an inlet cowl and one or more support frames. The inlet cowl has a leading edge, an outer side that extends from the leading edge to an outer aft edge, and an inner side that extends from the leading edge to an inner aft edge. The inlet cowl has an annular barrel shape oriented about a central longitudinal axis. The inlet cowl defines a cavity aft of the leading edge between the inner side and the outer side. The one or more support frames are disposed within the cavity and extend from the inner side to the outer side of the inlet cowl to structurally support the annular barrel shape of the inlet cowl. The inlet cowl includes an extended section of the outer side that extends to the outer aft edge. The extended section longitudinally projects beyond the inner aft edge of the inner side. An exterior surface of the inlet cowl is seamless along an entire length of the outer side from the leading edge to the outer aft edge, and is defined by a metallic coating of a lipskin.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

Figure 1:
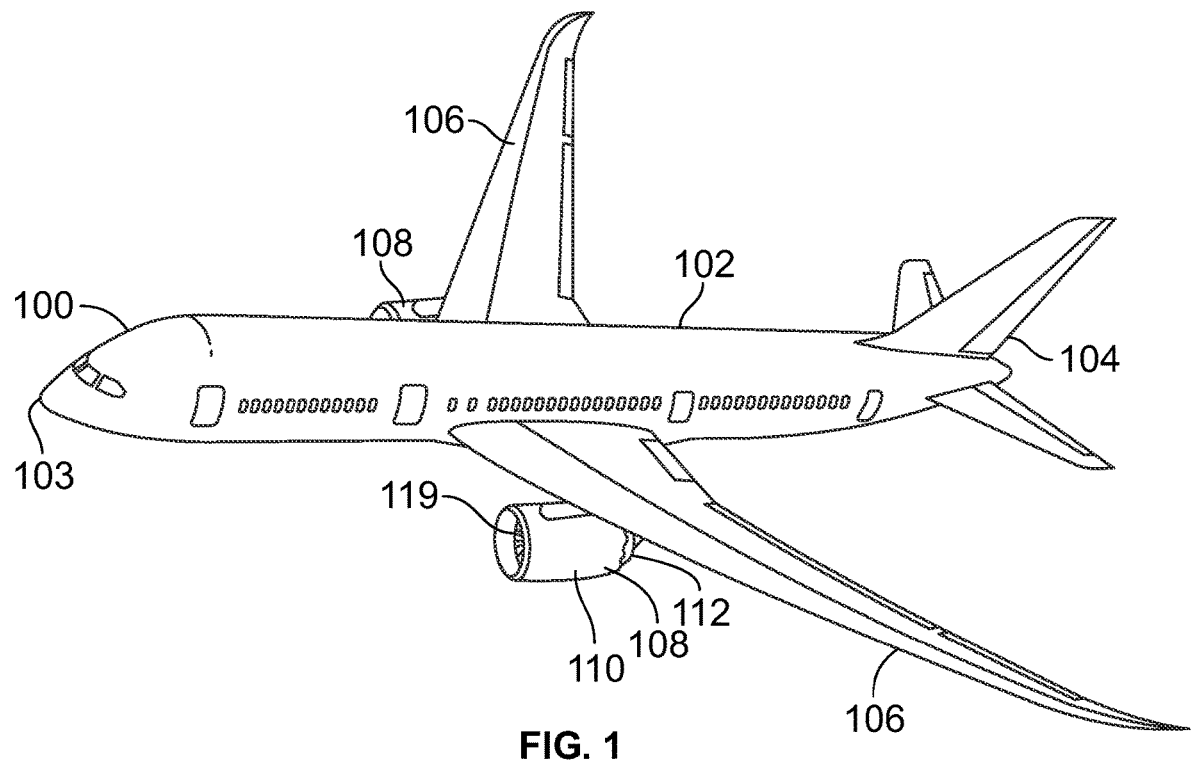
FIG. 1 is a perspective illustration of an aircraft.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

This invention was made with UK Government support under 22482—UK Aerospace Research and Technology Programme. The UK Government may have certain rights in this invention.

Certain embodiments of the present disclosure provide systems and methods for providing an inlet assembly that is designed to enhance laminar fluid flow along an exterior surface of the inlet cowl. The laminar fluid flow may be enhanced by extending a longitudinal length of a laminar flow region along the exterior surface of the inlet cowl. The laminar flow region may be elongated by designing the outer side of the inlet cowl to have a contour that promotes laminar fluid flow and is seamless along the exterior surface. For example, an outer side of the inlet cowl may be seamless from a leading edge of the inlet cowl to an outer aft edge of the outer side. The exterior surface of the outer side may be relatively smooth and uniform along the length, providing a surface quality that promotes laminar flow. The exterior surface may be defined by a metallic coating of a lipskin of the inlet cowl. The metallic coating may define the leading edge and the entire length of the exterior surface of the outer side from the leading edge to the outer aft edge. The inlet assembly described herein may have a continuous material system in which the metallic coating of the lipskin seamlessly extends along the leading edge of the inlet cowl and the entire length of the outer side of the inlet cowl.

In an embodiment, the laminar flow region may be elongated by extending the length of the outer side of the inlet cowl. For example, the inlet cowl may include an extended section that longitudinally projects, in an aft direction, beyond an inner aft edge of an inner side of the inlet cowl. The extended section may be located aft of a fan cowl interface and/or A flange. The laminar flow region may extend along at least a portion of the extended section, promoting laminar flow along the inlet cowl beyond the traditional fan cowl split line. The extended section may be structurally supported by a rigid and strong carbon fiber reinforced polymer (CFRP) material of a composite panel of the lipskin, along which the metallic coating is disposed. Optionally, the extended section may be structurally supported by support frames that extend from the inner side of the inlet cowl to the extended section of the outer side. The support frames and/or CFRP material provide rigidity to maintain the designed contour of the outer side of the inlet cowl to extend the laminar flow region onto the extended section.

The inlet assembly described herein may have several benefits. For example, the inlet assembly may have a relatively short inlet architecture incorporated into a compact, short nacelle, which achieves greater fuel efficiency relative to a longer nacelle. In another example, extending the lipskin along the entire length of the outer side of the inlet cowl may reduce manufacturing complexity and cost relative to conventional inlets that have a discrete outer barrel section coupled to a lipskin, which defines a leading edge section. Enhancing the laminar flow region along the outer side of the inlet cowl, as described above, may result in improved aerodynamic performance, such as greater fuel efficiency, relative to conventional inlet cowls. For example, at least some conventional inlet cowls may include seams at interfaces between the lipskin and the outer barrel panel. The seams cause turbulent fluid flow along the exterior surface, which is detrimental to flight and engine performance.

The inlet assembly described herein may be incorporated with a fluid ice protection system (FIPS) that is designed to prohibit ice formation on and/or remove accumulated ice from the leading edge section of the inlet cowl. The inlet assembly with the enhanced laminar flow region, as described herein, may be incorporated with any type of FIPS, such as a pneumatic system that supplies heated air into the inlet cowl and/or a hydraulic system that supplies an anti-ice liquid into the inlet cowl. In one example FIPS embodiment, the lipskin of the inlet cowl may include perforations (e.g., holes) that extend through the thickness of the lipskin, such that each perforation penetrates through both the composite panel and the metallic coating. The perforations may be relatively small and may be laser-formed. For example, the perforations may be microscopic (e.g., with micron scale diameters). The FIPS may supply an anti-ice liquid into the inlet cowl, for the liquid to weep through the perforations onto the exterior surface of the metallic coating. The liquid prevents the formation of ice (and removes any ice already present) along the inlet, which can be detrimental to flight and engine performance. The FIPS may include a plenum back wall that is coupled to the interior surface of the lipskin to define a plenum (e.g., cavity). The anti-ice liquid is supplied to the plenum through one or more conduits that extend from a reservoir remote from the inlet cowl. The FIPS may include one or more membranes within the plenum that absorb and distribute the anti-ice liquid to the perforations. For example, the membrane(s) may extend across and cover all or a majority of the perforations, such that the anti-ice fluid enters the perforations from the membrane(s).

Referring now to the drawings, which illustrate various embodiments of the present disclosure, FIG. 1 is a perspective illustration of an aircraft 100. The aircraft 100 may include a fuselage 102 extending from a nose 103 to an empennage 104. The empennage 104 may include one or more tail surfaces for directional control of the aircraft 100.

The aircraft 100 includes a pair of wings 106 extending from the fuselage 102. One or more propulsion systems 108 propel the aircraft 100. The propulsion systems 108 are supported by the wings 106 of the aircraft 100, but may be mounted to the fuselage or tail in other types of aircraft. Each propulsion system 108 includes a rotor assembly 119 with rotors that spin to direct air.

The rotor assembly 119 of each propulsion system 108 is surrounded by a nacelle 110. The nacelle 110 is an outer casing or housing that holds the rotor assembly 119. The nacelle 110 includes an inlet section, referred to as an inlet cowl, at a leading or front end of the nacelle 110. The nacelle 110 may also include a fan cowl, a thrust reverser section, and an aft fairing section located behind the inlet cowl along a longitudinal length of the nacelle 110. The inlet cowl has an inner barrel that defines an air inlet duct for directing air to the rotor assembly 119. The inner barrel may have an acoustic panel to facilitate reducing noise created by the rotor assembly 119. The nacelle 110 may have an exhaust nozzle 112 (e.g., a primary exhaust nozzle and a fan nozzle) at an aft end of the propulsion system 108.

In an embodiment, each propulsion system 108 may include or represent a gas turbine engine. The rotor assembly 119 may be a portion of the engine. The engine burns a fuel, such as gasoline or kerosene, to generate thrust for propelling the aircraft 100.

In an alternative embodiment, the rotor assemblies 119 of some of all of the propulsion systems 108 may be driven by electrically-powered motors, rather than by the combustion of fuel within a gas turbine engine. For example, the motors of such propulsion systems 108 may be electrically-powered by an onboard electrical energy storage device (e.g., a battery system) and/or an onboard electrical energy generation system.

Figure 11:
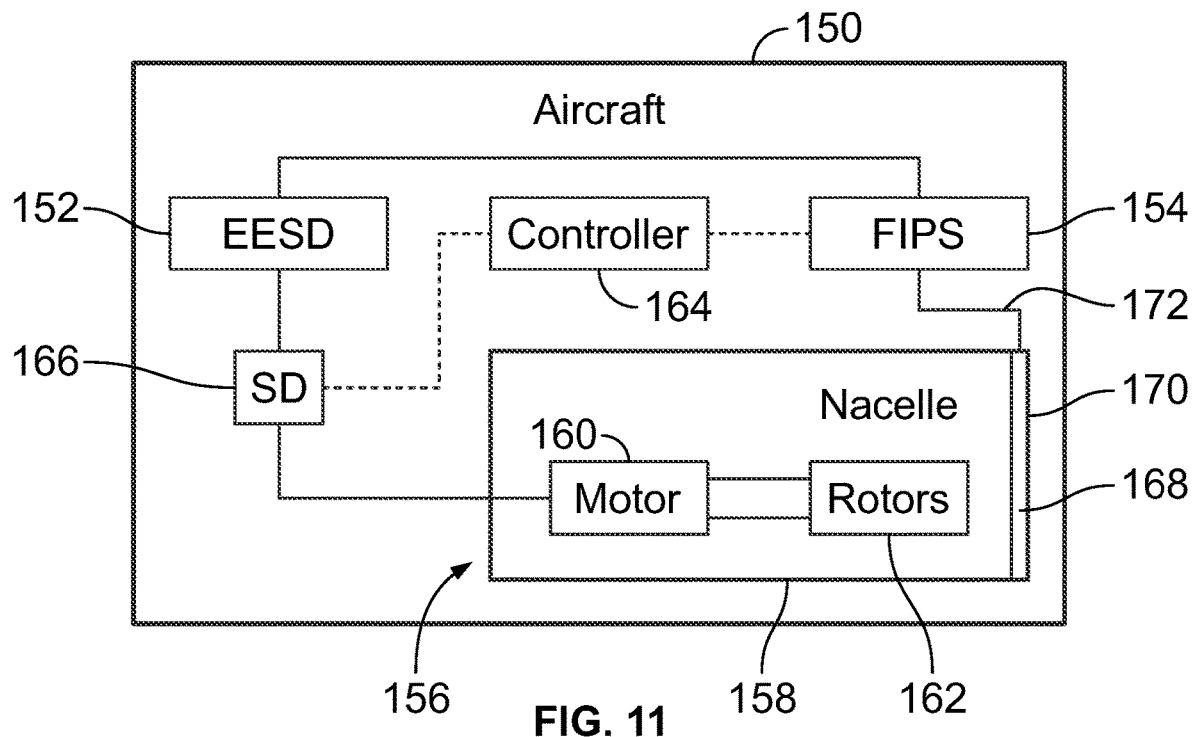
FIG. 11 is a block diagram of a second aircraft according to an embodiment.

FIG. 11 is a block diagram of a second aircraft 150 according to an embodiment. The aircraft 150 in FIG. 11 may be an all-electric aircraft that lacks any fuel combustion engine, or a hybrid aircraft that includes at least one fuel combustion engine. The aircraft 150 includes an electrical energy storage device (EESD) 152, a fluid ice protection system (FIPS) 154, and a propulsion system 156. The propulsion system 156 includes a nacelle 158 that surrounds a motor 160 and a rotor assembly 162 ("rotors" in FIG. 11). The motor 160 is powered by electric current supplied from the EESD 152. The EESD 152 may be a battery system that includes at least one battery cell. Optionally, the EESD 152 may include one or more capacitors or other charge-storing devices. The EESD 152 may be rechargeable.

The aircraft 150 includes a controller 164 that has one or more processors. The controller 164 may control the delivery of electric current to the motor 160 via one or more switch devices (SD) 166 along a power delivery circuit path between the EESD 152 and the motor 160. The motor converts electrical energy to mechanical energy that exerts a torque on the rotor assembly 162 to spin the rotors. The aircraft 150 may be an unmanned aerial vehicle (e.g., a drone), a passenger aircraft, or the like.

The FIPS 154 supplies an anti-ice liquid to an inlet cowl 168 of the nacelle 158 to prohibit the formation of ice along a leading edge 170 of the nacelle 158. The anti-ice liquid is conveyed through one or more conduits 172 that form a fluid delivery network. The FIPS 154 may be powered by electric current supplied from the EESD 152 or another onboard electrical energy storage device. The operation of the FIPS 154 may be controlled by the controller 164, or another controller. All of the components shown in FIG. 11 may be disposed onboard the aircraft 150. The aircraft 150 may include more than one of the illustrated components, such as multiple propulsion systems 156.

Figure 2:
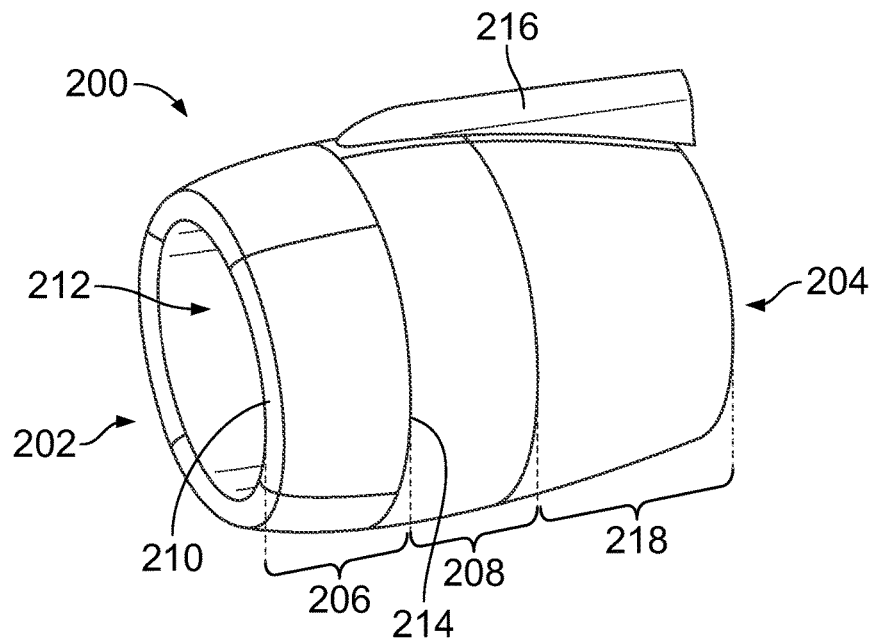
FIG. 2 illustrates an embodiment of a nacelle of a propulsion system of an aircraft according to an embodiment.

FIG. 2 illustrates an embodiment of a nacelle 200 of a propulsion system of an aircraft according to an embodiment. The nacelle 200 may be one of the nacelles 110 of the propulsion systems 108 shown in FIG. 1 and/or the nacelle 158 of the propulsion system 156 shown in FIG. 11. The nacelle 200 extends a length from a front end 202 of the nacelle 200 to an aft end 204 of the nacelle 200 (opposite the front end 202). The nacelle 200 may include an inlet cowl 206 and a fan cowl 208. The inlet cowl 206 defines a leading edge 210 of the nacelle 200 at the front end 202, to direct air into a core 212 of the nacelle 200. The fan cowl 208 is aft of the inlet cowl 206 and is connected to the inlet cowl 206. The fan cowl 208 may connect to and extend from an outer aft edge 214 of the inlet cowl 206. The fan cowl 208 may surround the rotor assembly, such as one or more fans mounted at a forward end of an engine within the core 212.

The nacelle 200 may include a mount 216 for securing the nacelle 200 and the rotary components held by the nacelle 200 to the aircraft. The mount 216 may be a pylon. The nacelle 200 includes at least one aft section 218 that is disposed aft of the fan cowl 208 along the length of the nacelle 200. When the nacelle 200 holds a gas turbine engine, the aft section(s) 218 may surround engine components such as a compressor, combustion chamber (or combustor), and turbine. The aft section(s) 218 may include or represent a thrust reverser, aft fairing, or the like. The aft section(s) 218 may define the aft end 204 and an aft nozzle through which air and exhaust products are emitted from the propulsion system.

Figure 3:
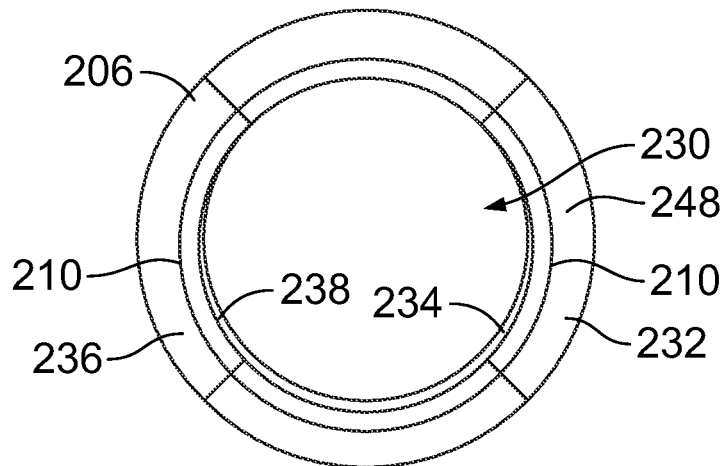
FIG. 3 is a front view of an inlet cowl of the nacelle shown in FIG. 2.
Figure 4:
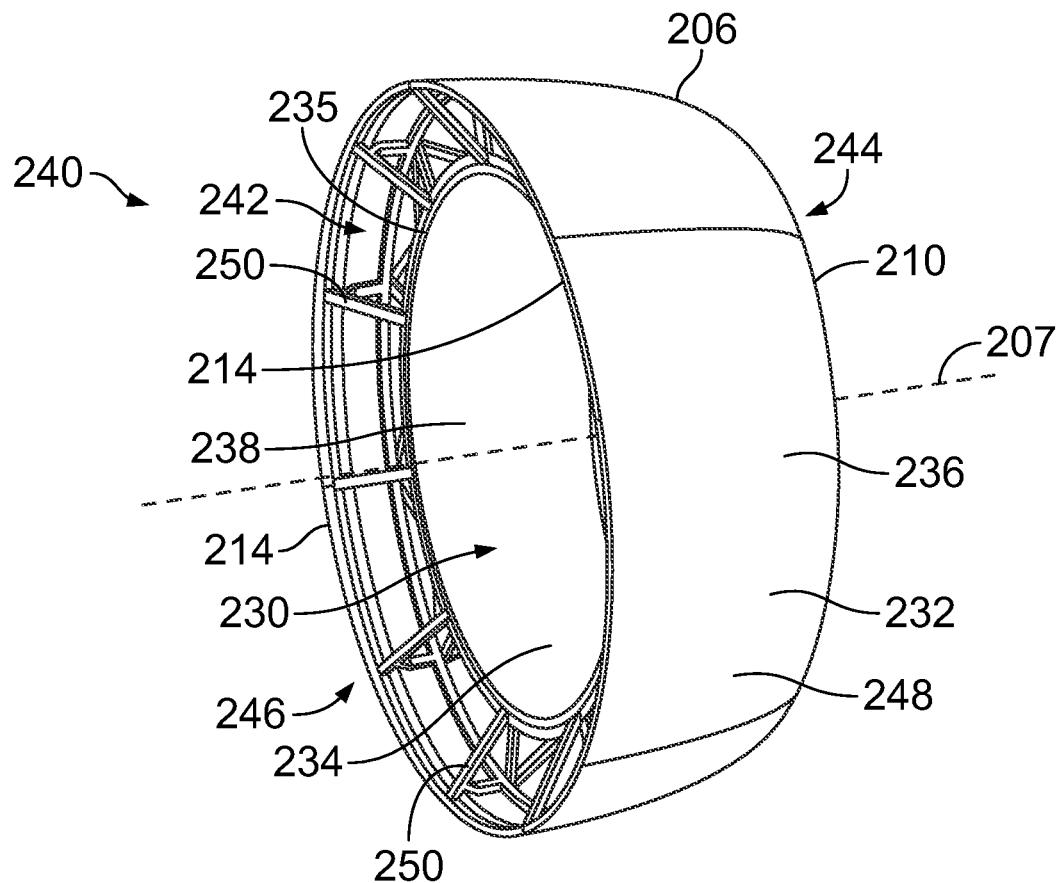
FIG. 4 is a perspective view of the inlet cowl shown in FIGS. 2 and 3, showing an aft edge thereof.

FIG. 3 is a front view of the inlet cowl 206 shown in FIG. 2. FIG. 4 is a perspective view of the inlet cowl 206 shown in FIGS. 2 and 3, showing the outer aft edge 214 of the inlet cowl 206. The inlet cowl 206 has an annular barrel shape that defines a central opening 230. The term "annular barrel shape" means that the inlet cowl 206 defines a closed, ring-like shape when viewed from the front. The annular barrel shape is oriented about a central longitudinal axis 207. The central longitudinal axis 207 extends through the central opening 230. The inlet cowl 206 may have a generally cylindrical shape. For example, the leading edge 210 may be circular. The inlet cowl 206 directs air through the central opening 230 into the core 212 of the nacelle 200 shown in FIG. 2.

The inlet cowl 206 has the leading edge 210, an outer side 232 and an inner side 234. The outer side 232 extends from the leading edge 210 to the outer aft edge 214. The inner side 234 extends from the leading edge 210 to an inner aft edge 235 of the inner side 234. The outer side 232 is radially outside of the inner side 234 and surrounds the inner side 234. The outer side 232 and inner side 234 optionally may be referred to as an outer barrel portion and an inner barrel portion, respectively. The inner side 234 may define the central opening 230, and operates as an intake duct to supply air into the core 212 for the rotor assembly 119. The inlet cowl 206 defines a cavity 242 that is aft of the leading edge 210 and radially disposed between the outer side 232 and the inner side 234. The cavity 242 is closed at a front end 244 of the inlet cowl 206, and open at a rear or aft end 246 of the inlet cowl 206.

The inlet cowl 206 may include a lipskin 236 and an acoustic panel 238. In an embodiment, the lipskin 236 defines the leading edge 210 and the outer side 232. The acoustic panel 238 is coupled to the lipskin 236 along the inner side 234, and the acoustic panel 238 defines a length of the inner side 234. For example, the lipskin 236 may define a front portion of the inner side 234, and the acoustic panel 238 may define a rear or aft portion of the inner side 234. The acoustic panel 238 is located forward of the fan cowl 208. The acoustic panel 238 may be located in relatively close proximity to one or more fans or other rotary equipment. The acoustic panel 238 may have a plurality of acoustic perforations for absorbing noise generated by the rotor assembly and/or the airflow passing through the inlet cowl 206.

FIG. 4 shows an inlet assembly 240 that includes the inlet cowl 206 and one or more support frames 250. The inlet assembly 240 includes multiple support frames 250 in the illustrated embodiment. The support frames 250 are disposed within the cavity 242 of the inlet cowl 206 to mechanically support the contour of the inlet cowl 206. For example, the support frames 250 extend across the cavity 242 from the inner side 234 to the outer side 232 to provide structural rigidity to the inlet cowl 206 (e.g., the lipskin 236 and the acoustic panel 238). The support frames 250 may help withstand pressure and other forces exerted on the exterior surface 248 without deflecting and changing the contour of the outer side 232. For example, deflection of the outer side 232 changes the contour, which may disrupt the laminar fluid flow along the exterior surface 248. One or more of the support frames 250 may be open truss-like structures that enable air flow through openings in the support frames 250 (within the cavity 242). In an embodiment, the inlet assembly 240 may lack bulkheads that partition the cavity 242 into multiple channels or regions that are blocked off from each other (e.g., fluidly isolated from each other). Avoiding bulkheads which sub-divide the cavity 242 may reduce the complexity of manufacturing the inlet assembly 240 relative to conventional inlets.

The inlet assembly 240 may also include one or more components of a fluid ice protection system (FIPS) 262 (shown in FIG. 6) integrated into the cavity 242 of the inlet cowl 206. The FIPS 262 supplies an anti-ice liquid onto the exterior surface 248 of the inlet cowl 206 to prohibit ice formation on the exterior surface 248. The exterior surface 248 that receives the anti-ice liquid is a leading edge section 258 (shown in FIG. 5) of the inlet cowl 206 that encompasses the leading edge 210. The exterior surface 248 is exposed to the elements, such as sunlight, moisture, debris, wind, birds, etc.

Figure 5:
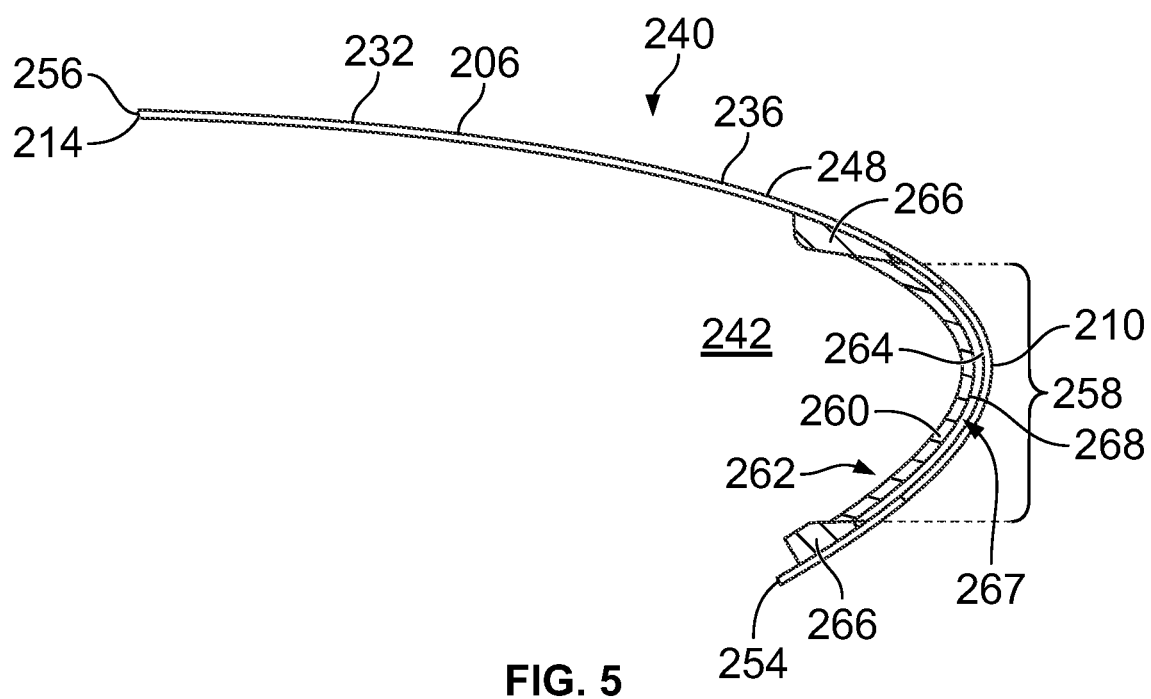
FIG. 5 is a cross-sectional view of a portion of an inlet assembly according to an embodiment.

FIG. 5 is a cross-sectional view of a portion of the inlet assembly 240 according to an embodiment. The illustrated portion shows the lipskin 236 of the inlet cowl 206 without the acoustic panel 238. For example, the acoustic panel 238 may couple to an inner edge 254 of the lipskin 236 during the assembly process. The lipskin 236 in the illustrated embodiment has a curved shape that radially and longitudinally extends forward from the inner edge 254 to the leading edge 210, and then rearward to an outer, aft edge 256 of the lipskin 236. The lipskin 236 may be relatively thin. The area of the inlet cowl 206 (e.g., the lipskin 236 thereof) that includes the leading edge 210 and the areas radially adjacent the leading edge 210 is referred to herein as a front or leading edge section 258 of the lipskin 236. The outer, aft edge 256 may define the aft edge 214 of the inlet cowl 206, such that the lipskin 236 extends the full length of the inlet cowl 206 along the outer side 232.

In an embodiment, the exterior surface 248 of the inlet cowl 206 is smooth and defined by a single, continuous construct along the entire length of the outer side 232. For example, a metallic coating 272 (shown in FIG. 6) of the lipskin 236 may define the exterior surface 248 along the entire length of the outer side 232 from the leading edge 210 to the outer aft edge 214 of the inlet cowl 206. There are no seams, joints, or interfaces along the outer side 232, which promotes laminar air flow along the aerodynamic exterior surface 248 by avoiding turbulence-inducing interfaces. The inlet assembly 240 described herein may provide a longer and/or larger surface area along which the air flow is laminar, than conventional inlets, as described in more detail with reference to FIGS. 9 and 12. The enlarged laminar flow region may provide a substantial drag benefit and fuel efficiency gain over conventional inlets.

The components of the FIPS 262 integrated into the inlet assembly 240 may include a plenum back wall 260 that is affixed to the inlet cowl 206. The plenum back wall 260 is disposed within the cavity 242 of the inlet cowl 206 and extends along the leading edge section 258 of the inlet cowl 236. The plenum back wall 260 may be affixed to an interior surface 264 of the inlet cowl 206. In an embodiment, the plenum back wall 260 is bonded to the interior surface 264. In an embodiment, the lipskin 236 of the inlet cowl 206 includes two (e.g., first and second) integrated protrusions 266 along the interior surface 264 that serve as mounts on which to affix the plenum back wall 260. The protrusions 266 project from the interior surface 264 into the cavity 242. The protrusions 266 may be integral to the lipskin 236. In an alternative embodiment, the protrusions 266 may be discrete components that are themselves mounted to the interior surface 264 and serve to indirectly secure the plenum back wall 260 to the lipskin 236. The plenum back wall 260 is mounted to the inlet cowl 206 to define a plenum 267 (e.g., fluid manifold) for receiving and containing the anti-ice liquid of the FIPS 262. The plenum 267 is longitudinally defined between the interior surface 264 of the lipskin 236 and a front surface 268 of the back wall 260. The plenum 267 is radially defined between the two protrusions 266. The plenum 267 may be located along the leading edge section 258 of the lipskin 236 only. For example, the plenum 267 may not extend along the outer side 232.

Figure 6:
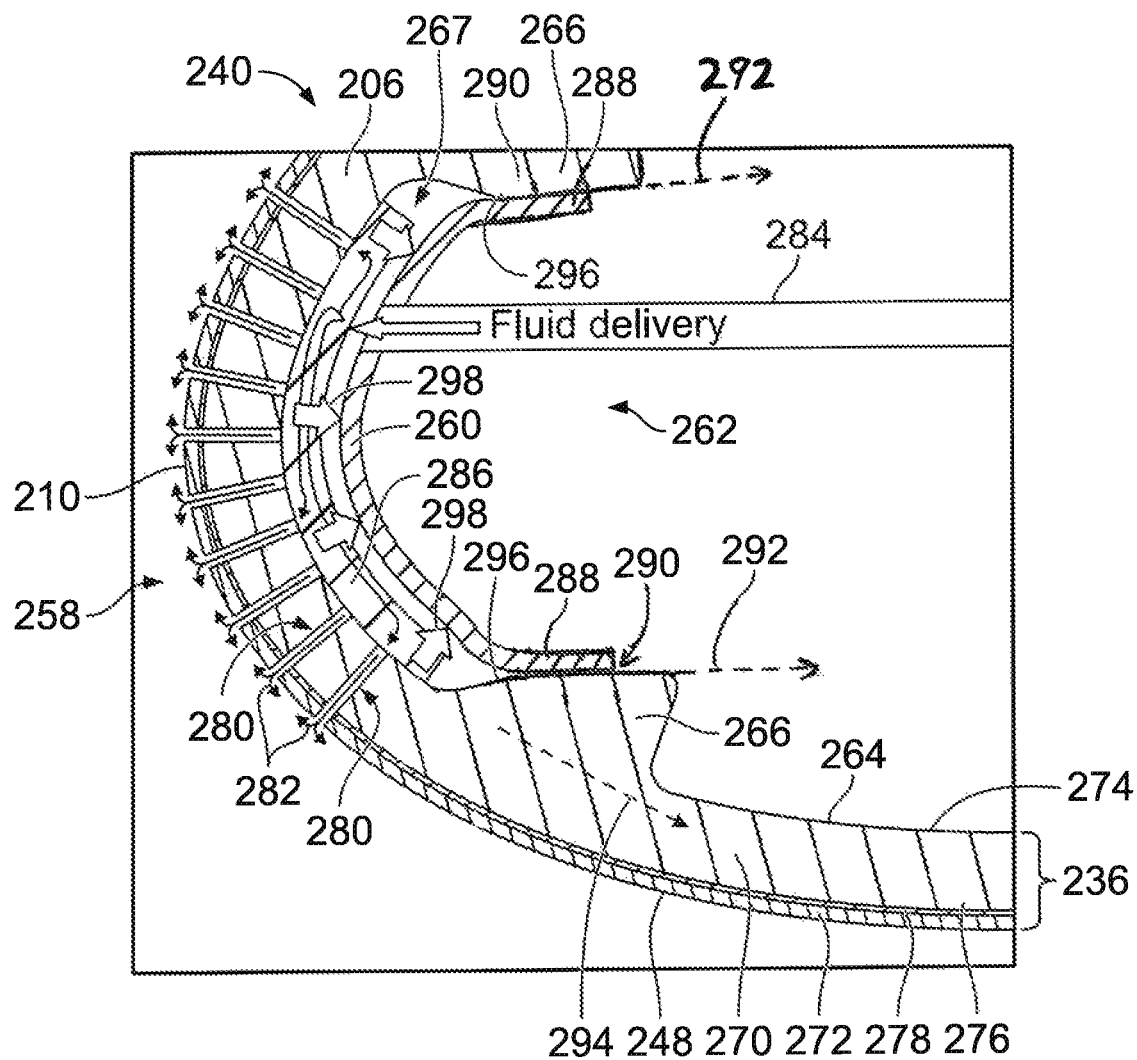
FIG. 6 illustrates an enlarged, schematic rendering of the inlet assembly at a leading edge according to an embodiment.

FIG. 6 illustrates an enlarged, schematic rendering of the inlet assembly 240 at the leading edge 210 according to an embodiment. The illustrated components in FIG. 6 are depicted for ease of description, and may not be drawn to scale. The lipskin 236 of the inlet cowl 206 in an embodiment is a stack-up of multiple different layers. The lipskin 236 may include at least a composite panel 270 and a metallic coating 272. The metallic coating 272 is exterior of the composite panel 270 to provide an erosion shield that protects the composite panel 270 from leading edge damage. The metallic coating 272 may define the exterior surface 248 of the inlet cowl 206 along at least the leading edge section 258, and optionally all of the surface area of the inlet cowl 206 that is exposed to the environmental elements. The composite panel 270 and metallic coating 272 may continuously extend the full length of the lipskin 236.

The composite panel 270 has an interior surface 274 and an exterior surface 276 opposite the interior surface 274. The interior surface 274 may define the interior surface 264 of the inlet cowl 206. The metallic coating 272 is disposed along the exterior surface 276 of the composite panel 270. In an embodiment, the metallic coating 272 is indirectly connected to the exterior surface 276 via one or more intervening layers. The one or more intervening layers may include an electrically conductive layer 278 that is provided to assist with the application of the metallic coating 272 on the composite panel 270. The conductive layer 278 may be a metallic material that has a different composition than the metallic coating 272. For example, the conductive layer 278 may be a thin silver (Ag) loaded sheet.

In an embodiment, the composite panel 270 is or includes carbon fiber. For example, the composite panel 270 may have a carbon fiber reinforced polymer (CFRP) material. The polymer may be a plastic (e.g., thermoplastic) or the like. The metallic coating 272 may be a metal alloy. For example, the metallic coating 272 in an embodiment is a nickel-cobalt (NiCo) alloy. The metallic coating 272 may be deposited onto the lipskin 236 to solidify and harden. In an embodiment, the metallic coating 272 is applied via electroplating. For example, the metallic coating 272 may be a NiCo alloy that is electroplated directly onto the conductive layer 278 of the lipskin 236.

The lipskin 236 of the inlet cowl 206 may define multiple perforations 280 that penetrate the thickness of the lipskin 236 along the leading edge section 258. The perforations 280 may extend continuously through the composite panel 270, the conductive layer 278, and the metallic coating 272. The perforations 280 are aligned with and open to the plenum 267, such that the perforations 280 are fluidly connected to the plenum 267 and receive anti-ice liquid 282 from the plenum 267. The characteristics of the perforations 280, such as diameter, location, percent-open-area, etc., may be selected based on application-specific parameters. In an embodiment, the perforations 280 have micron scale diameters. For example, a diameter of each perforation may be less than 100 microns, and optionally less than 50 microns. The microscopic perforations 280 may be formed via laser drilling. The tiny perforations 280 enable to the liquid 282 under pressure to slowly weep through the perforations 280 onto the exterior surface 248. The anti-ice liquid 282 may be a solution that provides freezing point depression. For example, the anti-ice liquid 282 may be a propylene glycol-based solution, an ethylene glycol-based solution, or the like.

The components of the FIPS 262 that are illustrated in FIG. 6 include the plenum back wall 260, a fluid delivery conduit 284 that is coupled to the plenum back wall 260, and one or more membranes 286. The conduit 284 may be a duct, tube, or the like that is a component of a fluid delivery network of the FIPS 262. The fluid delivery network provides a path from a fluid reservoir to the plenum 267. The anti-ice liquid 282 may be pumped through the conduit 284 into the plenum 267 through an aperture in the back wall 260. The one or more membranes 286 are disposed within the plenum 267 (e.g., between the lipskin 236 and the back wall 260) and receive the anti-ice liquid 282. A single membrane 286 is shown in FIG. 6. The membrane 286 may be designed to absorb and distribute the anti-ice liquid 282 to the perforations 280. The membrane 286 may be secured to the interior surface 264 of the inlet cowl 206, such as by bonding. The membrane 286 aligns with the perforations such that the membrane 286 may extend across and cover all or a majority of the perforations 280. The membrane 286 may spread the anti-ice liquid 282 along a length of the membrane 286 which supports a more uniform distribution of the liquid 282 among the perforations 280. The membrane 286 optionally may be a porous material, such as a porous plastic material, an open-celled foam material, or the like.

In an embodiment, the plenum back wall 260 includes first and second flanges 288 at respective ends of the back wall 260. The flanges 288 are secured to the protrusions 266 of the lipskin 236 along respective contact interfaces 290. The flanges 288 may be bonded to the protrusions 266 at the contact interfaces 290. The bonding may be accomplished via application of an adhesive, a heat treatment, and/or the like. In an embodiment, the contact interfaces 290 are angled transverse to the tangent of the interior surface 264 of the lipskin 236 proximate to the contact interfaces 290 to enhance retention of the plenum back wall 260 to the lipskin 236. The contact interfaces 290 extend along ramp surfaces 296 of the protrusions 266. The contact interfaces 290 have vectors 292 that are not parallel to the tangent 294 of the interior surface 262. The contact interfaces 290 are angled to shift the pressure loading dynamics along the bonded interfaces 290 and enable the plenum back wall 260 to withstand more force before separating from the lipskin 236, relative to bonding the back wall 260 to a flat or non-projecting area of the interior surface 264 of the lipskin 236.

For example, the plenum 267 may experience pressure that tends to force the plenum back wall 260 away from the leading edge 210, as indicated by the force arrows 298. Furthermore, the composite panel 270 and the protrusions 266 are not metallic, so the plenum back wall 260 cannot be welded to the lipskin 236. In an embodiment, the protrusions 266 may be composed of a rigid, closed-cell foam. By bonding the flanges 288 to the protrusions 266 along the angled contact interfaces 290, the forces exerted on the back wall 260 are withstood by shear retention along the contact interfaces 290. For example, the forces on the back wall 260 may be acutely angled relative to the interface vectors 292, which is resisted in part by shear loading at the interfaces 290. Without the angled contact interfaces 290, the forces on the back wall 260 may peel the back wall 260 off the interior surface 264 of the lipskin 236, obstructing, if not entirely foiling, operation of the FIPS 262.

Figure 7:
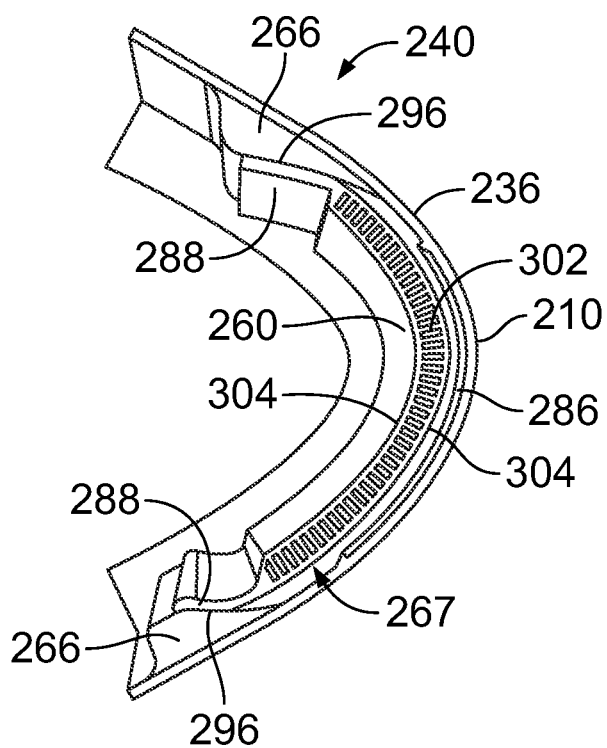
FIG. 7 is a cross-sectional view of a nose portion of the inlet assembly according to an embodiment.
Figure 8:
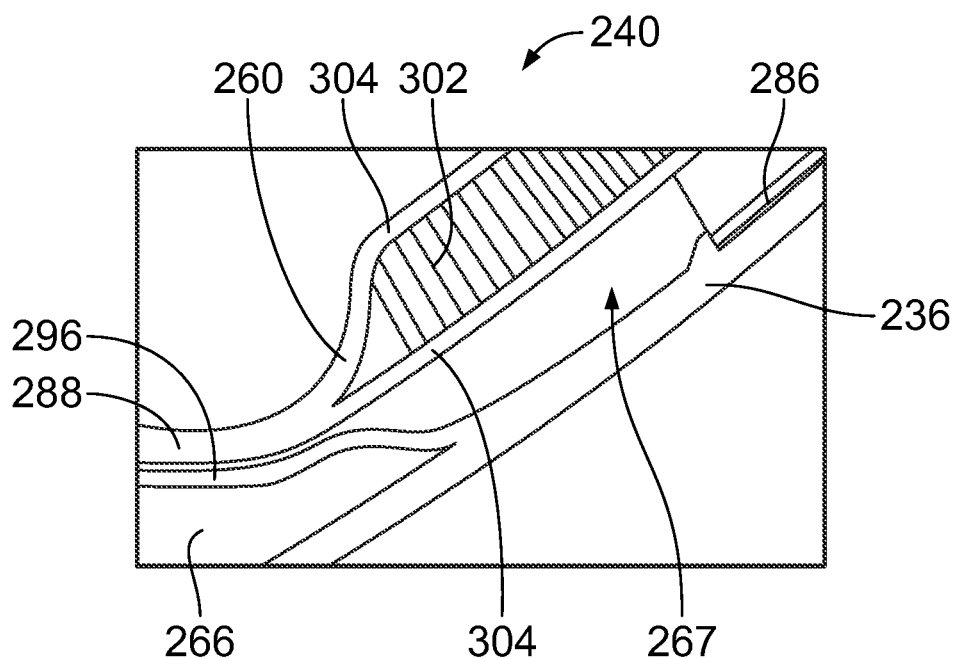
FIG. 8 is an enlarged view of a segment of the nose portion shown in FIG. 7.

FIG. 7 is a cross-sectional view of a nose portion of the inlet assembly 240 according to an embodiment. FIG. 8 is an enlarged view of a segment of the nose portion shown in FIG. 7. The views in FIGS. 7 and 8 may be more accurate in terms of scale and shapes of the components relative to the illustration in FIG. 6. FIG. 7 shows the leading edge 210 of the lipskin 236, the plenum back wall 260, the protrusions 266, and the membrane 286. With reference to both FIGS. 7 and 8, the thin membrane 286 is disposed within the plenum 267. The flanges 288 of the back wall 260 are secured to the ramp surfaces 296 of the protrusions 266, as described with reference to FIG. 6. In an embodiment, the plenum back wall 260 may be a composite structure. For example, the back wall 260 may include a core layer 302 sandwiched between two outer layers 304. The core layer 302 may be a honeycomb structure. In an embodiment, the protrusions 266 may include a rigid, closed-cell foam material. The protrusions 266 may be integrated onto the lipskin 236, such as formed as portions of the CFRP composite panel 270.

Figure 9:
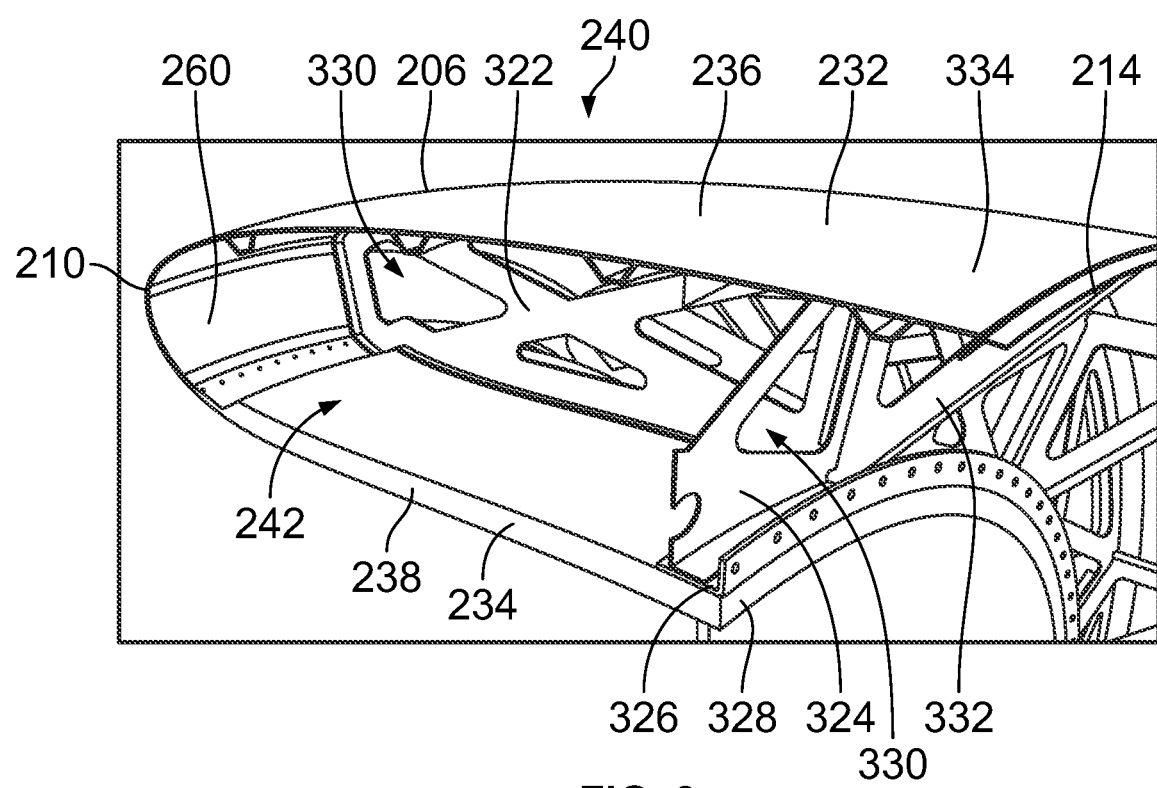
FIG. 9 is a perspective cross-sectional view of a portion of the inlet assembly according to an embodiment.

FIG. 9 is a perspective cross-sectional view of a portion of the inlet assembly 240 according to an embodiment. The acoustic panel 238 longitudinally extends along the inner side 234, and the lipskin 236 longitudinally extends the length of the outer side 232. The plenum back wall 260 is disposed at the front end of the cavity 242, interior of the leading edge 210. The inlet assembly 240 may include support frames 250 within the cavity 242 to mechanically support the extended length of the lipskin 236 and withstand forces exerted on the lipskin 236 to maintain the shape of the inlet cowl 206.

In an embodiment, the support frames 250 include longitudinally-extending support frames 322 that are circumferentially spaced apart. The support frames 250 may also include circumferentially-extending support frames 324. The circumferentially-extending support frames 324 may be located proximate to the outer aft edge 214 of the inlet cowl 206. For example, the support frames 324 may be coupled to a flange 326 mounted to an aft edge 328 of the acoustic panel 238, which defines the inner aft edge 235 of the inlet cowl 206. The support frames 324 may be perpendicular to the support frames 322. The support frames 322, 324 may all radially extend across the cavity 242 from the outer side 232 to the inner side 234, and may be coupled to both the outer and inner sides 232, 234. In an embodiment, the support frames 322, 324 are open, truss-like structures that permit fluid flow through openings 330 in the frames 322, 324. The support frames 322, 324 may be rearward or aft of the plenum back wall 260.

In an embodiment, the outer side 232 extends rearward beyond the inner aft edge 235 of the inner side 234. The portion of the outer side 232 that extends beyond the inner aft edge 235 is an extended section 334 of the outer side 232. The extended section 334 may overhang relative to the acoustic panel 238. The inlet assembly 240 may include one or more angled support frames 332 to support the overhanging, extended section 334 of the outer side 232.

Figure 12:
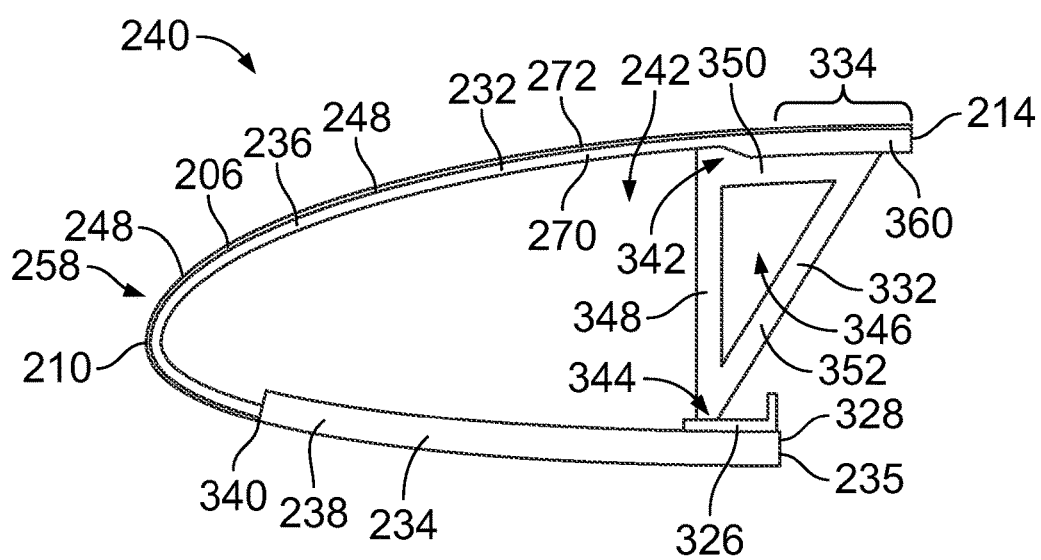
FIG. 12 is a side cross-sectional view of a portion of the inlet assembly according to an embodiment.

FIG. 12 is a side cross-sectional view of a portion of the inlet assembly 240 according to an embodiment. The inlet assembly 240 may be the same as the inlet assembly 240 shown in FIG. 9, except that the plenum back wall 260 and the longitudinally-extending and circumferentially-extending support frames 322, 324 are omitted from FIG. 12. In an embodiment, the exterior surface 248 of the inlet cowl 206 is seamless along an entire length of the outer side 232 from the leading edge 210 to the outer aft edge 214.

The lipskin 236 may define both the leading edge section 258 (including the leading edge 210) and the outer side 232. For example, both the composite panel 270 and the metallic coating 272 of the lipskin 236 extend the entire length of the outer side 232 from the leading edge 210 to the outer aft edge 214. The metallic coating 272 may define the exterior surface 248 of the inlet cowl 206 along an entirety of both the leading edge section 258 and the outer side 232. The metallic coating 272 provides an erosion shield for the composite panel 270, and also provides a relatively smooth, uniform surface that promotes laminar flow. Because the metallic coating 272 continuously extends from the leading edge 210 to the outer aft edge 214, the outer side 232 is free of seams, joints, and other types of material interfaces. The lipskin 236 couples to the acoustic panel 238 at a joint 340. The joint 340 is disposed along the inner side 234 of the inlet cowl 205. The flow characteristics of air along the inner side 234 may not have as significant of an effect on flight performance and fuel efficiency as the flow characteristics along the outer side 232. As shown in FIG. 12, the acoustic panel 238 may be substantially thicker than a thickness of the lipskin 236.

In an embodiment, the inlet cowl 206 is designed to achieve a relatively long laminar flow region along the exterior surface 248 of the outer side 232. The laminar flow region is an area along which the moving air flow (during flight of the aircraft) is characterized by laminar flow, rather than turbulent flow. For example, a contour of the outer surface 232 may be designed to promote laminar flow. The contour may be designed based on laminar flow theory. Furthermore, the exterior surface 248 of the outer side 232 is defined by a smooth metallic coating 272 and is devoid of seams and other discontinuities. The laminar flow region may extend along the contour of the outer side 232 for the entire length of the outer side 232 (e.g., from the leading edge 210 to the outer aft edge 214).

FIG. 12 shows the extended section 334 of the outer side 232 of the inlet cowl 206 that longitudinally projects beyond the inner aft edge 235 of the inner side 234. The extended section 334 extends to, and includes, the outer aft edge 214.

The extended section 334 may be a seamless extension of the contour of the outer side 232. For example, the lipskin 236 may define the extended section 334, and the metallic coating 272 may define the exterior surface 248 of the inlet cowl 206 along the extended section 334. The laminar flow region may extend along the contour of the outer side 232 onto the extended section 334. By providing the extended section 334, the length of the laminar flow region may be elongated relative to not including the extending section 334. For example, the laminar flow region may longitudinally extend beyond a location at which the inner side 234 of the inlet cowl 206 interfaces with the fan cowl 208. The location at which the inner side 234 interfaces with the fan cowl 208 may be the flange 326 (e.g., the A flange), a fan cowl split line, and/or the like.

In an embodiment, the extended section 334 may be structurally supported by one or more angled support frames 332 within the cavity 242. For example, the angled support frame 332 may be assembled to maintain the contour of the outer side 232 along the extended section 334. The angled support frame 332 may prohibit the extended section 334 from deflecting from applied forces during operation, which could disrupt the laminar flow along the extended section 334. The angled support frame 332 has a first end 342 that contacts the extended section 334 and a second end 344 that contacts the inner side 234. For example, the second end 344 may be coupled to the flange 326 and/or to the acoustic panel 238. In an embodiment, the angled support frame 332 is triangular and defines one or more openings 346 through the support frame 332. For example, the angled support frame 332 includes a first leg 348 that radially extends across the cavity from the first end 342 to the second end 344. The support frame 332 includes a second leg 350 that longitudinally extends along a length of the extended section 334 and engages the extended section 334. The support frame 332 includes a third, angled leg 352 that extends across the cavity 342 from the inner side 234 to the extended section 334 and defines a hypotenuse of the triangular shape. In an alternative embodiment, the angled support frame 332 may not be triangular. For example, the support frame 332 may only include the first and second legs 348, 350 (not the third leg 352), or may only include the third leg 352 (not the first and second legs 348, 350). In another alternative embodiment, the angled support frame 332 may be an integral portion of the longitudinally-extended support frame 322 shown in FIG. 9, rather than a discrete component.

In an alternative embodiment, the extended section 334 may be inherently structurally supported by the composite panel 270 of the lipskin 236, instead of by the angled support frame(s) 332. For example, the composite panel 270 may include CFRP material that extends along the full length of the extended section 334 and has sufficient strength to structurally maintain the contour of the outer side 232, without discrete support frames. Optionally, the lipskin 236 may be formed such that additional plies of CFRP material are stacked along the extended section 334. As a result, the composite panel 270 may be thicker along the extended section 334 than along other portions of the lipskin 236, such as the leading edge section 258. FIG. 12 shows a thicker section 360 of the composite panel 270 along the extended section 334. Although FIG. 12 shows both the angled support frame 332 and the thicker section 360 of the composite panel 270, these features may be alternatives. For example, the angled support frame 332 may be installed without thickening the CFRP composite panel 270, or the CFRP composite panel 270 may be thickened to avoid installation of the angled support frame 332.

Figure 10:
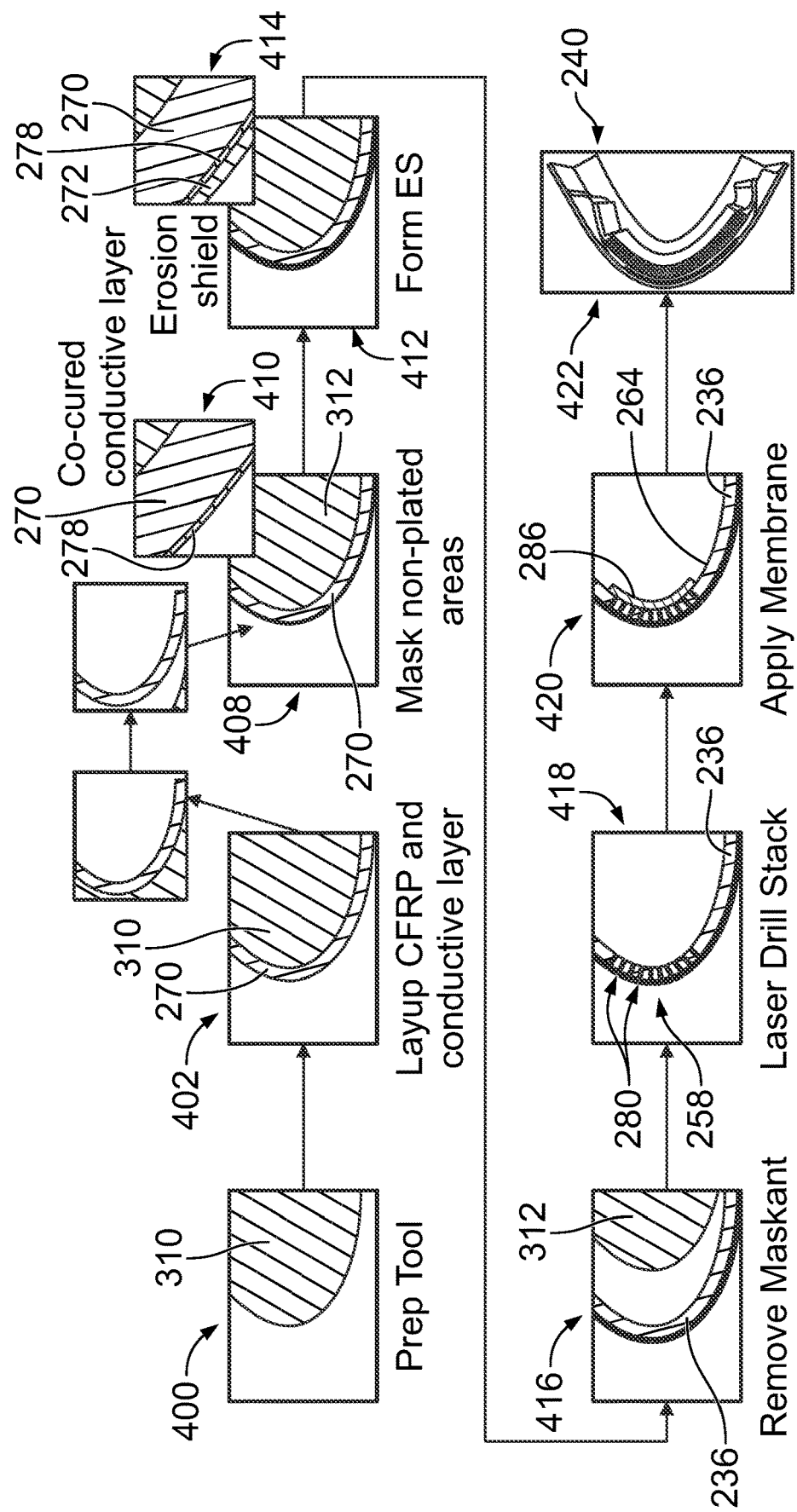
FIG. 10 is a schematic diagram depicting a process of assembling an inlet assembly according to an embodiment.

FIG. 10 is a schematic diagram depicting a process of assembling an inlet assembly according to an embodiment. The inlet assembly manufactured by the process may be the inlet assembly 240 shown in FIGS. 4 through 9. At box 400, a curved tool 310 is prepped for a layup process. The curved tool 310 may be a mold or mandrel. The tool 310 may have a shape that corresponds to a desired shape of the inlet cowl. At box 402, a carbon fiber reinforced polymer (CFRP) material is applied on the curved tool 310 to form the composite panel 270 via a layup process. The layup process may be an automated fiber placement (AFP) process in which multiple layers of fiber-reinforced material are applied on the tool 310. The layers may be tows or bundles of carbon fibers impregnated with an epoxy resin. The tows may be applied in different orientations relative to one another. Although not shown, the protrusions 266 of the lipskin 236 may be formed during the layup step shown in box 402.

The composite panel 270 may then be cured via a heat treatment and removed from the tool 310. Optionally, the conductive layer 278 may be applied to the exterior surface 276 of the composite panel 270. At box 408, non-plated areas of the composite panel 270 are masked by a maskant 312. The conductive layer 278, if present, may be co-cured at box 410.

At box 412, the metallic coating 272 is applied on the composite panel 270 (and conductive layer 278) by electroplating. The metallic coating 272 is shown in the inset enlarged view in box 414. At box 416, the maskant is removed from the structure, yielding the lipskin 236 (or stack). At box 418, the lipskin 236 is laser drilled to form perforations 280 through the thickness thereof in the leading edge section 258. At box 420, the membrane 286 is applied along the interior surface 264 of the inlet cowl 206 (e.g., the lipskin 236) to cover the perforations 280.

Box 422 shows a portion of the completed inlet assembly 240, similar to the view in FIG. 7. The assembly process may include additional steps not depicted in FIG. 10, such as bonding the plenum back wall 260 to the composite panel 270 and connecting the fluid delivery conduit 284 to the plenum back wall 260. Additional portions of the FIPS 262 may need to be assembled before the FIPS 262 is operational.

Figure 13:
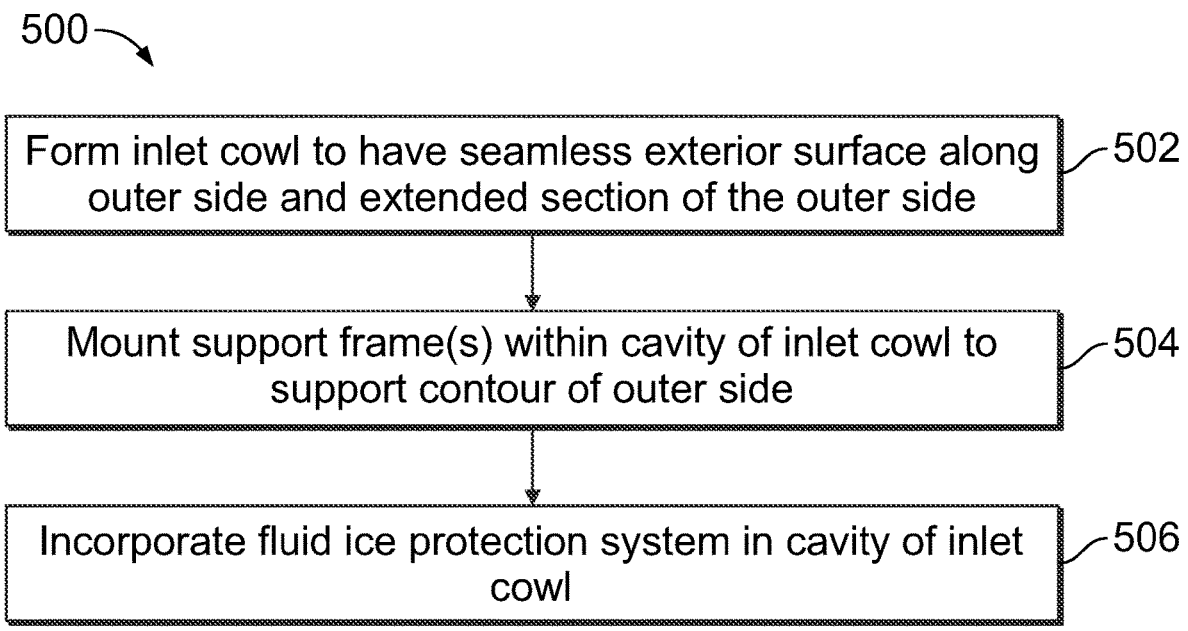
FIG. 13 is a flow chart of a method for producing an inlet assembly of a nacelle according to an embodiment.

FIG. 13 is a flow chart 500 of a method for producing an inlet assembly of a nacelle according to an embodiment. The method may include additional steps, fewer steps, and/or different steps than the steps illustrated in the flow chart 500. At step 502, an inlet cowl 206 is formed that includes a leading edge 210, an outer side 232 that extends from the leading edge 210 to an outer aft edge 214, and an inner side 234 that extends from the leading edge 210 to an inner aft edge 235. The inlet cowl 206 is formed such that an exterior surface 248 of the inlet cowl 206 is seamless along an entire length of the outer side 232 from the leading edge 210 to the outer aft edge 214.

In an embodiment, the inlet cowl 206 is formed at step 502 via a series of sub-steps. For example, the formation of the inlet cowl 206 includes forming a lipskin 236 that has a metallic coating 272. The metallic coating 272 defines the exterior surface 248 of the inlet cowl 206 along the leading edge 210 and the entire length of the outer side 232. The lipskin 236 may be shaped during formation such that the outer side 232 of the inlet cowl 206 has a contour that provides a laminar flow region from the leading edge 210 to the outer aft edge 214.

Optionally, the lipskin 236 may be formed by applying a carbon fiber reinforced polymer (CFRP) material on a curved tool, then curing the CFRP material to form a composite panel 270 of the lipskin 236. The metallic coating 272 may be applied along an exterior surface 276 of the composite panel 270 to protect the composite panel 270 from damage. An electrically conductive layer 278 may be applied on the exterior surface 276 prior to applying the metallic coating 272, such that the layer 278 is sandwiched between the coating 272 and the composite panel 270. In an embodiment, the layer 278 is a metal film, and the metallic coating 272 is a nickel alloy that is electroplated on the metal film layer 278.

Another sub-step in the formation of the lipskin 236 of the inlet cowl 206 may be forming a plurality of perforations 280 along a leading edge section 258 of the lipskin 236. The plurality of perforations 280 penetrate through the composite panel 270 and the metallic coating 272 to convey a fluid through a thickness of the lipskin 236 onto the exterior surface 248 of the inlet cowl 206. The perforations 280 may be formed via laser drilling. The perforations 280 have diameters less than 100 microns.

Optionally, forming the inlet cowl 206 may include shaping the inlet cowl 206 to have an annular barrel shape oriented about a central longitudinal axis 207. The inlet cowl 206 may be formed such that an extended section 334 of the outer side 232, that extends to the outer aft edge 214, longitudinally projects beyond the inner aft edge 235 of the inner side 234. The inlet cowl 206 may be formed to define a cavity 242 between the inner side 234 and the outer side 232.

At step 504, one or more support frames 250 are mounted within the cavity 242 of the inlet cowl 206. At least some of the support frames 250 may include angled support frames 332 that extend across the cavity 242 and are coupled to each of the inner side 234 and the extended section 334 of the outer side 232. The angled support frames 250 may structurally support the extended section 334 to maintain the contour of the outer side 232 and resist deformation and/or deflection due to applied forces. The support frames 250 may include longitudinally-extending frames 322 and/or circumferentially-extending frames 324, either in addition to the angled support frames 332 or as an alternative to the angled support frames 332. At least some of the support frames 250 may define openings that permit airflow therethrough. As an alternative to step 504, the CFRP composite panel 270 may be formed with a sufficient number of plies and thickness to provide sufficient rigidity to maintain the contour of the outer side 232 without installing the support frames 250.

At step 506, the method may include incorporating a FIPS into the inlet cowl 206. In one example FIPS, a membrane 286 is secured to the interior surface 264 of the inlet cowl 206 such that the membrane 286 covers the perforations 280. The membrane 286 may be a porous plastic designed to distribute anti-ice liquid among the perforations 280. Then, a plenum back wall 260 is affixed to the interior surface 264 of the inlet cowl 206 to define a plenum 267 between the interior surface 264 and a front surface 268 of the plenum back wall 260. The plenum back wall 260 aligns with the perforations 280 defined through a thickness of the inlet cowl 206 such that the plenum 267 is fluidly connected to the perforations 280. The membrane 286 is encapsulated within the plenum 267. Optionally, the plenum back wall 260 is affixed to the inlet cowl 206 by bonding first and second flanges 288 of the plenum back wall 260 to respective ramp surfaces 296 of first and second protrusions 266 that project from the interior surface 264. The plenum 267 is defined between the first and second protrusions 266.

The FIPS assembly may include coupling a fluid delivery network of one or more conduits to the plenum back wall 260. The fluid delivery network supplies an anti-ice liquid into the plenum 267 for the anti-ice liquid in the plenum 267 to penetrate through the perforations 280 onto an exterior surface 248 of the inlet cowl 206 along a leading edge section 258 of the inlet cowl 206. A reservoir and a pump of the FIPS 262 may be coupled to the conduits of the network. The pump may be controlled to supply the anti-ice liquid from the reservoir along the network to the plenum 267.

Further, the disclosure comprises examples according to the following clauses:

Clause 1. An inlet assembly of a nacelle, the inlet assembly comprising:
  an inlet cowl including a leading edge, an outer side that extends from the leading edge to an outer aft edge, and an inner side that extends from the leading edge to an inner aft edge, wherein an exterior surface of the inlet cowl is seamless along an entire length of the outer side from the leading edge to the outer aft edge, the inlet cowl including a lipskin that has a metallic coating, the metallic coating defining the exterior surface of the inlet cowl along the leading edge and the entire length of the outer side.

Clause 2. The inlet assembly of Clause 1, wherein the exterior surface defines a laminar flow region that extends along a contour of the outer side from the leading edge to the outer aft edge.

Clause 3. The inlet assembly of Clause 1 or Clause 2, wherein the lipskin includes a composite panel that defines an interior surface of the inlet cowl and extends the entire length of the outer side from the leading edge to the outer aft edge.

Clause 4. The inlet assembly of Clause 3, wherein the composite panel includes a carbon fiber reinforced polymer (CFRP) material.

Clause 5. The inlet assembly of Clause 3 or Clause 4, wherein an electrically conductive layer is sandwiched between the composite panel and the metallic coating.

Clause 6. The inlet assembly of any of Clauses 3-5, wherein the lipskin defines a plurality of perforations that penetrate through the composite panel and the metallic coating along a leading edge section of the lipskin to convey a fluid through a thickness of the lipskin onto the exterior surface of the inlet cowl.

Clause 7. The inlet assembly of any of Clauses 1-6, wherein the inlet cowl has an annular barrel shape oriented about a central longitudinal axis, and an extended section of the outer side, that extends to the outer aft edge, longitudinally projects beyond the inner aft edge of the inner side.

Clause 8. The inlet assembly of Clause 7, wherein the exterior surface defines a laminar flow region that extends along a contour of the outer side from the leading edge onto to the extended section of the outer side.

Clause 9. The inlet assembly of Clause 7 or Clause 8, wherein the inlet cowl defines a cavity between the inner side and the outer side, and the inlet assembly further comprises support frames within the cavity, one or more of the support frames being coupled to each of the inner side and the extended section of the outer side to structurally support the extended section.

Clause 10. The inlet assembly of any of Clauses 7-9, wherein the lipskin includes a composite panel that has a CFRP material and extends the entire length of the outer side from the leading edge to the outer aft edge, wherein the CFRP material has sufficient strength to structurally maintain a contour of the outer side along the extended section.

Clause 11. The inlet assembly of any of Clauses 1-10, wherein the inlet cowl defines a cavity between the inner side and the outer side, and the inlet assembly further comprises one or more longitudinally-extending support frames within the cavity, the longitudinally-extending support frames defining openings to permit fluid flow therethrough.

Clause 12. The inlet assembly of any of Clauses 1-11, wherein the inlet cowl defines a cavity between the inner side and the outer side, and the inlet assembly further comprises one or more circumferentially-extending support frames within the cavity, the circumferentially-extending support frames defining openings to permit fluid flow therethrough.

Clause 13. A method for producing an inlet assembly of a nacelle, the method comprising:
  forming an inlet cowl that includes a leading edge, an outer side that extends from the leading edge to an outer aft edge, and an inner side that extends from the leading edge to an inner aft edge, wherein the inlet cowl is formed such that an exterior surface of the inlet cowl is seamless along an entire length of the outer side from the leading edge to the outer aft edge,
  wherein the inlet cowl is formed by forming a lipskin that has a metallic coating, the metallic coating defining the exterior surface of the inlet cowl along the leading edge and the entire length of the outer side.

Clause 14. The method of Clause 13, wherein forming the inlet cowl comprises shaping the lipskin such that the outer side of the inlet cowl has a contour that provides a laminar flow region from the leading edge to the outer aft edge.

Clause 15. The method of Clause 13 or Clause 14, wherein the lipskin is formed by:
  applying a carbon fiber reinforced polymer (CFRP) material on a curved tool;
  curing the CFRP material to form a composite panel of the lipskin; and
  applying the metallic coating along an exterior surface of the composite panel to protect the composite panel from damage.

Clause 16. The method of Clause 15, further comprising forming a plurality of perforations along a leading edge section of the lipskin, the plurality of perforations penetrating through the composite panel and the metallic coating to convey a fluid through a thickness of the lipskin onto the exterior surface of the inlet cowl.

Clause 17. The method of any of Clauses 13-16, wherein forming the inlet cowl comprises shaping the inlet cowl to have an annular barrel shape oriented about a central longitudinal axis, and the inlet cowl is formed such that an extended section of the outer side, that extends to the outer aft edge, longitudinally projects beyond the inner aft edge of the inner side.

Clause 18. The method of Clause 17, wherein the inlet cowl is formed to define a cavity between the inner side and the outer side, and the method further comprises mounting support frames within the cavity, wherein at least some of the support frames are coupled to each of the inner side and the extended section of the outer side to structurally support the extended section.

Clause 19. The method of any of Clauses 13-18, wherein the inlet cowl is formed to define a cavity between the inner side and the outer side, and the method further comprises mounting support frames within the cavity, wherein at least some of the support frames extend longitudinally or circumferentially within the cavity and define openings to permit fluid flow therethrough.

Clause 20. An inlet assembly of a nacelle, the inlet assembly comprising:
an inlet cowl including a leading edge, an outer side that extends from the leading edge to an outer aft edge, and an inner side that extends from the leading edge to an inner aft edge, the inlet cowl having an annular barrel shape oriented about a central longitudinal axis, the inlet cowl defining a cavity aft of the leading edge between the inner side and the outer side; and
one or more support frames disposed within the cavity and extending from the inner side to the outer side of the inlet cowl to structurally support the annular barrel shape of the inlet cowl,
wherein the inlet cowl includes an extended section of the outer side that extends to the outer aft edge, the extended section longitudinally projecting beyond the inner aft edge of the inner side, and
wherein an exterior surface of the inlet cowl is seamless along an entire length of the outer side from the leading edge to the outer aft edge, and is defined by a metallic coating of a lipskin.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are example embodiments. Many other embodiments will be apparent to those of ordinary skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. An inlet assembly of a nacelle, the inlet assembly comprising:
an inlet cowl including a leading edge, an outer side that extends from the leading edge to an outer aft edge, and an inner side that extends from the leading edge to an inner aft edge, the outer aft edge of the inlet cowl configured to interface with a fan cowl of the nacelle, wherein an exterior surface of the inlet cowl is seamless along an entire length of the outer side from the leading edge to the outer aft edge, the inlet cowl including a lipskin that has a metallic coating, the metallic coating defining the exterior surface of the inlet cowl along the leading edge and the outer side.

2. The inlet assembly of claim 1, wherein the exterior surface defines a laminar flow region that extends along a contour of the outer side from the leading edge to the outer aft edge.

3. The inlet assembly of claim 1, wherein the lipskin includes a composite panel that defines an interior surface of the inlet cowl and extends the entire length of the outer side from the leading edge to the outer aft edge.

4. The inlet assembly of claim 3, wherein the composite panel includes a carbon fiber reinforced polymer (CFRP) material.

5. The inlet assembly of claim 3, wherein an electrically conductive layer is sandwiched between the composite panel and the metallic coating.

6. The inlet assembly of claim 3, wherein the lipskin defines a plurality of perforations that penetrate through the composite panel and the metallic coating along a leading edge section of the lipskin to convey a fluid through a thickness of the lipskin onto the exterior surface of the inlet cowl.

7. The inlet assembly of claim 1, wherein the inlet cowl has an annular barrel shape oriented about a central longitudinal axis, and an extended section of the outer side, that extends to the outer aft edge, longitudinally projects beyond the inner aft edge of the inner side.

8. The inlet assembly of claim 7, wherein the exterior surface defines a laminar flow region that extends along a contour of the outer side from the leading edge to the extended section of the outer side.

9. The inlet assembly of claim 7, wherein the inlet cowl defines a cavity between the inner side and the outer side, and the inlet assembly further comprises support frames within the cavity, one or more of the support frames being coupled to each of the inner side and the extended section of the outer side to structurally support the extended section.

10. The inlet assembly of claim 7, wherein the lipskin includes a composite panel that has a CFRP material and extends the entire length of the outer side from the leading edge to the outer aft edge, wherein the CFRP material structurally maintains a contour of the outer side along the extended section.

11. The inlet assembly of claim 1, wherein the inlet cowl defines a cavity between the inner side and the outer side, and the inlet assembly further comprises one or more longitudinally-extending support frames within the cavity, the longitudinally-extending support frames defining openings to permit fluid flow therethrough.

12. The inlet assembly of claim 1, wherein the inlet cowl defines a cavity between the inner side and the outer side, and the inlet assembly further comprises one or more circumferentially-extending support frames within the cavity, the circumferentially-extending support frames defining openings to permit fluid flow therethrough.

13. A method for producing an inlet assembly of a nacelle, the method comprising:
   forming an inlet cowl that includes a leading edge, an outer side that extends from the leading edge to an outer aft edge, and an inner side that extends from the leading edge to an inner aft edge, the outer aft edge of the inlet cowl configured to interface with a fan cowl of the nacelle, wherein the inlet cowl is formed such that an exterior surface of the inlet cowl is seamless along an entire length of the outer side from the leading edge to the outer aft edge,
   wherein the inlet cowl is formed by forming a lipskin that has a metallic coating, the metallic coating defining the exterior surface of the inlet cowl along the leading edge and the entire length of the outer side.

14. The method of claim 13, wherein forming the inlet cowl comprises shaping the lipskin such that the outer side of the inlet cowl has a contour that provides a laminar flow region from the leading edge to the outer aft edge.

15. The method of claim 13, wherein the lipskin is formed by:
   applying a carbon fiber reinforced polymer (CFRP) material on a curved tool;
   curing the CFRP material to form a composite panel of the lipskin; and
   applying the metallic coating along an exterior surface of the composite panel to protect the composite panel from damage.

16. The method of claim 15, further comprising:
   forming a plurality of perforations along a leading edge section of the lipskin, the plurality of perforations penetrating through the composite panel and the metallic coating to convey a fluid through a thickness of the lipskin onto the exterior surface of the inlet cowl.

17. The method of claim 13, wherein forming the inlet cowl comprises shaping the inlet cowl to have an annular barrel shape oriented about a central longitudinal axis, and the inlet cowl is formed such that an extended section of the outer side, that extends to the outer aft edge, longitudinally projects beyond the inner aft edge of the inner side.

18. The method of claim 17, wherein the inlet cowl is formed to define a cavity between the inner side and the outer side, and the method further comprises mounting support frames within the cavity, wherein at least some of the support frames are coupled to each of the inner side and the extended section of the outer side to structurally support the extended section.

19. The method of claim 13, wherein the inlet cowl is formed to define a cavity between the inner side and the outer side, and the method further comprises mounting support frames within the cavity, wherein at least some of the support frames extend longitudinally or circumferentially within the cavity and define openings to permit fluid flow therethrough.

20. An inlet assembly of a nacelle, the inlet assembly comprising:
   an inlet cowl including a leading edge, an outer side that extends from the leading edge to an outer aft edge, and an inner side that extends from the leading edge to an inner aft edge, the outer aft edge of the inlet cowl configured to interface with a fan cowl of the nacelle, the inlet cowl having an annular barrel shape oriented about a central longitudinal axis, the inlet cowl defining a cavity aft of the leading edge between the inner side and the outer side; and
   one or more support frames disposed within the cavity and extending from the inner side to the outer side of the inlet cowl to structurally support the annular barrel shape of the inlet cowl,
   wherein the inlet cowl includes an extended section of the outer side that extends to the outer aft edge, the extended section longitudinally projecting beyond the inner aft edge of the inner side, and
   wherein an exterior surface of the inlet cowl is seamless along an entire length of the outer side from the leading edge to the outer aft edge, and is defined by a metallic coating of a lipskin.

* * * * *